United States Patent [19]
Faris et al.

[11] Patent Number: 6,099,971
[45] Date of Patent: Aug. 8, 2000

[54] POLYSILOXANE ABRASION AND STATIC RESISTANT COATING

[75] Inventors: Tom V. Faris, Pataskala; Steven C. Akey, Dublin; David T. Chan, Columbus, all of Ohio

[73] Assignee: Plaskolite, Inc., Columbus, Ohio

[21] Appl. No.: 09/149,124

[22] Filed: Sep. 9, 1998

Related U.S. Application Data

[60] Provisional application No. 60/058,530, Sep. 9, 1997.
[51] Int. Cl.⁷ .............................. B32B 9/04; B32B 27/00; H01B 1/04; B05D 5/12
[52] U.S. Cl. .............. 428/447; 106/287.16; 252/519.31; 252/519.33; 252/521.3; 427/164; 427/387; 427/393.5; 427/397.7; 427/412.5; 427/419.8; 428/451; 428/522
[58] Field of Search ................................ 427/387, 389.7, 427/164, 167, 397.7, 412.5, 419.8; 106/287.16; 252/500, 511, 521.3, 519.31, 519.33; 428/447, 451, 522, 523

[56] References Cited

U.S. PATENT DOCUMENTS

| | | | |
|---|---|---|---|
| 3,463,660 | 8/1969 | Bentley et al. | 427/407.2 |
| 3,627,565 | 12/1971 | Plueddemann | 427/407.2 |
| 3,986,997 | 10/1976 | Clark . | |
| 4,246,038 | 1/1981 | Vaughn, Jr. et al. | 106/287.16 |
| 4,286,038 | 8/1981 | Lu et al. | 430/108 |
| 4,606,934 | 8/1986 | Lee et al. | 427/76 |
| 5,449,712 | 9/1995 | Gierke et al. | 427/393.4 |
| 5,486,420 | 1/1996 | Nishihara et al. | 428/405 |
| 5,693,442 | 12/1997 | Weiss et al. | 430/66 |
| 5,731,117 | 3/1998 | Ferrar et al. | 430/66 |
| 5,840,800 | 11/1998 | Joffre et al. | 524/806 |
| 5,895,794 | 4/1999 | Berg et al. | 523/217 |

*Primary Examiner*—Diana Dudash
*Attorney, Agent, or Firm*—Vorys Sater Seymour & Pease LLP

[57] ABSTRACT

A curable coating composition for preparing an anti-static coating contains from about 50% by weight to about 90% by weight of a dispersion of colloidal silica and a curable methylsilsesquioxane in a lower ($C_1$–$C_5$) alkanol, and from about 10% by weight to about 50% by weight of an aminofunctional silane component.

13 Claims, No Drawings

POLYSILOXANE ABRASION AND STATIC RESISTANT COATING

CROSS-REFERENCE TO RELATED APPLICATION

This application claims the benefit of U.S. Provisional Application No. 60/058,530, filed Sep. 9, 1997.

BACKGROUND OF THE INVENTION

1. Field of the Invention

This invention relates to synthetic resin coatings capable of dissipating surface electrostatic charge and more particularly to siloxane coatings having abrasion resistance and permanent static-dissipation properties.

2. Brief Description of the Prior Art

Polysiloxane coatings have been extensively used as protective coatings for articles made from synthetic resins in order to provide the relatively soft resin with a hard, abrasion-resistant surface. Curable coating compositions for applying such abrasion-resistant coatings are disclosed, for example, in U.S. Pat. Nos. 3,986,997 and 4,246,038. The entire disclosure of U.S. Pat. Nos. 3,986,997 and 4,246,038 is incorporated herein by reference. Such abrasion-resistant coatings are desirable and even necessary in applications such as coating of optically transparent materials such as plastic window glazing, protective screens for cathode ray tubes and screens for rear-projection television apparatus. For such articles, surface scratches are especially undesirable because the accumulation of such scratches causes the article to become hazy and thereby decreases the transparency of the window, viewing screen, or the like.

However, hard, abrasion-resistant coatings tend to have a very high surface resistivity, which makes them prone to accumulate static charge and very slow to dissipate that charge. The static charge on the surface tends to attract dust, which also causes a loss of clarity of the transparent article. In some cases the static charge may even interfere with the operation of electrical equipment positioned close to the charged surface, e.g., within a plastic cabinet that accumulates static surface charge.

Auxiliary anti-static coatings, sprayed onto the surface, have been used to alleviate the problem of retained static charge. However, such sprayed coatings are not permanent, but must be renewed from time to time.

Accordingly, a need has continued to exist for a hard, abrasion-resistant coating that has satisfactory permanent static electricity dissipation properties, especially for use in coating transparent substrates.

SUMMARY OF THE INVENTION

The problem of providing an abrasion-resistant coating having permanent anti-static properties has now been alleviated by the curable siloxane coating composition of the invention which comprises from about 50% by weight to about 90% by weight of a dispersion of colloidal silica and a curable methylsilsesquioxane in a $C_1$–$C_5$ aliphatic alcohol, and from about 10% by weight to about 50% by weight of an aminofunctional silane component.

The coating composition is particularly useful for coating transparent plastic substrates.

Accordingly, it is an object of the invention to provide a curable siloxane coating composition.

A further object is to provide a curable siloxane coating composition that can be used to prepare an abrasion-resistant, static-dissipating coating.

A further object is to provide a curable coating composition that has good resistance to abrasion.

A further object is to provide a curable coating composition that combines good abrasion resistance with good anti-static properties.

A further object is to provide a transparent coating having good abrasion resistance and good anti-static properties.

Further objects of the invention will become apparent from the description of the invention which follows.

DETAILED DESCRIPTION OF THE INVENTION AND PREFERRED EMBODIMENTS

The coating composition of the invention comprises a combination of a dispersion of colloidal silica and a curable methylsilsesquioxane in a lower ($C_1$–$C_5$) alkanol with an aminofunctional siloxane.

The alcoholic dispersion of colloidal silica and a methyl silsesquioxane is a conventional coating composition for preparing abrasion-resistant coatings on surfaces of softer materials, e.g., synthetic resins. Such materials contain a partial condensate of a compound of the formula $$R_1\text{—Si(OH)}_3$$

wherein $R_1$ represents an alkyl radical of 1–3 carbon atoms, with at least about 70% of the $R_1$ radicals being methyl radicals. Such partial condensates of predominantly methylsilsesquioxane are referred to herein as curable methylsilsesquioxanes. Coating compositions comprising alcoholic dispersions of colloidal silica and such curable methyl silsesquioxanes are described in U.S. Pat. No. 4,246,038, e.g., at column 3, lines 34–46. Such coating compositions are commercially available as Silvue 100® and Silvue 200® from SDC Coatings, Anaheim, Calif., and SHC 5020® and SHC 5020® from General Electric Company. The commercial dispersions comprise generally about 20% by weight of solids in a vehicle that is predominantly a lower alcohol, typically 2-propanol or 2-butanol. The dispersion may contain a small amount of water (typically 5% to 8% by weight).

The amount of the dispersion of colloidal silica and curable methylsilsesquioxane in the coating composition of the invention will range from about 50% by weight to about 90% by weight. Preferably the amount of the dispersion will range from about 78% by weight to about 90% by weight, and more preferably from about 80% by weight to about 90% by weight of the composition. In a particularly preferred embodiment the dispersion is present in an amount of about 85% by weight.

In order to provide anti-static properties to the cured coatings, the coating compositions of the invention incorporate an aminofunctional silane component. The aminofunctional silane component comprises one or more silanes having an amino$C_2$–$C_8$-loweralkyl group bound to the silicon atom therein. Such compounds are disclosed generally in U.S. Pat. No. 4,246,038, and may include, for example, amino-$C_2$–$C_8$-loweralkyl-tri-$C_1$–$C_8$-loweralkoxy silanes. Typical aminofunctional silanes include 3-aminopropyltriethoxy silane (APTES) and 3-aminopropyldiethoxy-methylsilane (APDMES). aminoalkyl silanes having more than one amino group may also be used, e.g., 2-(3-aminopropylamino)-ethyltriethoxysilane.

The aminofunctional silane component is present in the coating composition of the invention in an amount sufficient to reduce the surface resistivity of the coating prepared therefrom to a value below about $5 \times 10^{13}$ ohms per square (ohms/sq, $\Omega$/sq). Values of surface resistivity above that value are generally not useful because surfaces exhibiting such high resistivities typically dissipate static charge too slowly.

Typically, the aminofunctional silane component is present in the coating composition of the invention in a range of from about 10% by weight to about 50% by weight, preferably from about 10% by weight to about 22% by weight, and more preferably from about 10% by weight to about 20% by weight. In a particularly preferred embodiment the aminofunctional silane is present in an amount of about 15% by weight.

In order to enhance the coating properties of the coating composition of the invention and prepare a coating solution, it is preferred to dilute the composition with flow enhancers which adjust the surface tension for better spreading of the composition on the substrate. Such flow enhancers are known to those skilled in the art, and generally include lower aliphatic (e.g., $C_2$–$C_5$) alcohols such as 2-propanol and n-butanol. Typically, in order to provide optimal flow properties, the coating composition is diluted with about equal parts by weight of a mixture of lower aliphatic (e.g., $C_2$–$C_5$) alcohols. Consequently, such a coating solution will comprise from about 40 parts by weight to about 60 parts by weight of the coating composition and from about 60 parts by weight to about 40 parts by weight of the flow enhancing component. A preferred flow enhancing mixture for diluting the coating composition of the invention comprises about 10 parts by weight of 2-propanol and about 1 part by weight of n-butanol.

The pH of the coating solution is adjusted to a value between about 6.60 and 6.85 for maximum stability of the solution. The pH adjustment is ordinarily made with a lower aliphatic carboxylic acid, such as acetic acid. Typically between 2.5% and 2.8% of acetic acid is added in order to adjust the pH of the coating solution.

Consequently, the coating composition of the invention may be prepared by the following procedure: To 8.5 parts by weight of a commercially available curable methylsilsesquioxane dispersion of the type disclosed in U.S. Pat. Nos. 3,986,997 and 4,246,038 (e.g., Silvue 100, SDC Coatings, Anaheim, Calif.), 1.10 parts of 3-aminopropyl triethoxysilane (APTES) and 0.40 parts of 3-aminopropyl diethoxymethyl silane (APDMES) are added. The resulting composition is then diluted with 10.00 parts 2-propanol followed by 1.00 parts n-butanol (as flow enhancers). Acetic acid (usually about 2.5 to about 2.8% by weight) is added to adjust the pH to a value between 6.6 and 6.85.

The coating solution so prepared performs optimally after an aging period of about 15 hours. The solution can then be coated onto a substrate, e.g., a poly(methyl methacrylate), polycarbonate, or polystyrene sheet, by conventional coating methods such as dip coating or flow coating. Although the coating composition will generally adhere to the surface of a substrate after it is cured thereon, for a number of synthetic resin substrates, the adhesion is not durable enough for certain commercial applications. Accordingly, in order to improve the adhesion of polysiloxane coatings to certain plastic substrates, it is conventional to apply a primer solution and allow it to dry before the siloxane coating is applied. Determining the optimum primer for a given combination of a specific substrate and a specific siloxane coating solution is a matter of experimentation within the capability of a skilled practitioner. For poly(methyl methacrylate) (PMMA) substrates, a preferred primer is an acrylic emulsion in glycol ethers and water (XF-1133, SDC Coatings, Anaheim, Calif.). The siloxane solution of the invention is then applied to the primed substrate and allowed to flash dry at room temperature. The coating will become tack free under typical ambient conditions after a period of between 25 and 40 minutes. For extruded PMMA substrates, the coated substrate is then cured under conventional conditions, e.g., 80° C.–90° C. for 2–4 hours to effect a sufficient cure.

The compositions of the invention provide permanent anti-static abrasion-resistant coatings. When cured, the coating exhibits surface resistivity values between about $5 \times 10^9$ ohms/square and about $5 \times 10^{13}$ ohms/square (ASTM D257). As indicated above, coatings having a surface resistivity greater than about $5 \times 10^{13}$ ohms/square are generally not useful as static-dissipative coatings.

The coatings of the invention exhibit only slight increase in haze when tested by standard tests using a Taber abraser. As prepared, the coatings are essentially optically transparent, that is, the percent haze value for the coated substrate is not noticeably greater than that for the uncoated substrate. The increase in percent haze after abrasion under specified conditions with the Taber abraser is typically less than about 2.5% to 5.0% (Taber abraser, 100 cycles CS 10F wheels @ 500 g load). The percent haze in this test is defined as {(direct light transmission–diffuse light transmission)/direct light transmission}×100%.

The coating composition of the invention may be applied to a substrate by any conventional coating method. Typically, the coating composition is applied to a transparent substrate, e.g., of poly(methylmethacrylate), by coating with a wirewound rod, by flow coating, dip coating, roll coating or the like. It will be understood by the skilled practitioner that the viscosity of the coating composition may have to be adjusted, e.g., by dilution with a suitable solvent, to provide a viscosity suitable for a given coating method. The coating thickness may vary depending on the application. Typically the composition is coated at a thickness ranging from about 5 $\mu$m to about 25$\mu$, preferably from about 5$\mu$ to about 15 $\mu$m.

The invention will be illustrated by the following examples, which are intended to be illustrative and not limiting.

EXAMPLES 1–3

These examples illustrate the preparation of control compositions containing a dispersion of colloidal silica and a curable methylsilsesquioxane but no aminofunctional silane.

Poly(methyl methacrylate) (PMMA) panels were coated with commercially available dispersions of colloidal silica and a curable methylsilsesquioxane (Silvue 100® and Silvue 200®, SDC Coatings, Anaheim, Calif.) and SHC 5020® (General Electric Co.) by applying the dispersion at the top edge of a vertically oriented panel in an amount sufficient to coat the surface of the panel and allowing the dispersion to flow downward to coat the surface of the panel. The panels used for testing the control coatings were not precoated with a primer (indicated in the "Primer" column of Table 1 by the symbol "–"). The thickness of the coatings prepared is dependent on the viscosity of the dispersion used. However, the measured properties of the cured coating film, i.e., adhesion, abrasion resistance, and surface resistivity are not critically dependent on the thickness of the coated layer. The coated panels were allowed to dry for about 20 minutes at 77° F. until the surface of the coated film was tack free. The coating was then cured by placing the coated panels in an oven and heating at a temperature of 90° C. for 2 hours. The cured coatings were then tested for adhesion, abrasion resistance and static dissipation properties.

The coatings were tested for adhesion by ASTM Method D3359 Method B. In this procedure, a selected square area of the surface is scored into 100 1 mm×1 mm squares. A pressure sensitive tape is applied to the scored area and pulled off. The adhesion results are reported as the number of squares that remain adhered to the substrate. Thus a value of 100 indicates excellent adhesion, while a value of 0, signifying that all squares were removed by the adhesive tape, indicates poor adhesion. The adhesion value is reported in the "ADH" column of Table 1. The adhesion of the control coatings to the PMMA substrate was found to be excellent.

Abrasion resistance was measured using a Taber abraser according to the procedure of ASTM Method D1044-94. In this procedure the haze exhibited by the coated material before abrasion is measured by a photometric measurement of light scattered from a beam of light passing through the sample. The haze value of the substrate typically ranges from about 1.4% to about 1.7%, and the haze value of the coated substrate before abrasion is not significantly different. After abrasion with the Taber abraser, the haze is again measured and the increase in haze is taken as a measure of the abrasion resistance of the cured coating. Smaller values of increase of the haze indicate a harder and generally more useful coating. Typically the control coatings exhibit increases in haze after abrasion of less than 5%, typically ranging from about 2.5% to about 4.5%. Such values of haze increase are satisfactory for commercial applications and are indicated in the "AR" column of Table 1 with a "+" symbol. Greater values of haze increase are unsatisfactory and are indicated in Table 1 with a "−" symbol.

The surface resistivity was measured by ASTM Method D257. The test results are listed in Table 1 below for Example 1. The surface resistivity of the control coatings exceeded $2.2 \times 10^{14}$ ohms/square, the maximum value measurable with the instrument available. Accordingly the surface resistivity is listed in Table 1 as "++" indicating a value too high to measure and too high to provide static dissipation. Such a high value indicates severe static retention and a very long time for a static charge to dissipate naturally, typically several hours. Evidently such a high surface resistivity is not useful for articles such as plastic glazing where a static charge leads to accumulation of dust. EXAMPLES 4–5

These examples illustrate the preparation of abrasion-resistant, static-dissipating coatings using the composition of the invention.

3-Aminopropyl triethoxysilane (APTES) (7.50 g) and 3-aminopropyl diethoxymethylsilane (APDMES) (7.50 g) were added to a vessel containing 85.00 g of SHC 5020® with stirring. After thorough mixing, the composition was flow coated onto PMMA substrate panels by the procedure of Example 1. Both primed and unprimed substrates were used. The primed substrate was prepared by coating a PMMA substrate with a conventional primer for acrylate substrates, i.e., an acrylic emulsion in glycol ethers and water (XF-1133, SDC Coatings, Anaheim, Calif.). The examples prepared on primed substrates are indicated by the symbol "+" in the "Primer" column in Table 1, while the unprimed substrates are indicated by a "−" symbol. The coated compositions were allowed to dry until tack free and cured at 90° C. for two hours as in Example 1.

The cured coatings were tested for adhesion, abrasion resistance and surface resistivity as in Example 1. The results are indicated in Table 1 below. The adhesion to the primed substrate was excellent, while the adhesion to the unprimed substrate was unsatisfactory. The abrasion resistance was satisfactory. The surface resistivity was less than $5 \times 10^{13}$ ohms/sq, which is a satisfactory value for a static-dissipative coating, and is indicated by "S" in the "SR" column of Table 1.

EXAMPLES 6–7

3-Aminopropyl triethoxysilane (15.00 g) was added to a stirred vessel containing 85.00 g of Silvue 100®. The composition was coated onto primed and unprimed PMMA panels, and dried and cured as in Example 4. When tested by the procedures of Example 1, the abrasion resistance and surface resistivity were satisfactory, as indicated in Table 1. The adhesion to the primed substrate was excellent, while the adhesion to the unprimed substrate was unsatisfactory.

EXAMPLES 8–9

Examples 6 and 7 were repeated using Silvue 200® as the dispersion of colloidal silica and curable methylsilsesquioxane. The test results reported in Table 1 show that the abrasion resistance was satisfactory, and the surface resistivity for Example 8 was satisfactory (Example 9 was not tested). The adhesion was excellent to the primed substrate but unsatisfactory to the unprimed substrate.

EXAMPLE 10

This example illustrates a preferred embodiment of the invention.

3-Aminopropyl triethoxysilane (1.10 g) and 3-aminopropyl-diethoxymethylsilane (0.40 g) were added dropwise to 8.5 g of Silvue 100®. This solution was then diluted with 10.00 g of 2-propanol and 1.00 g of n-butanol to serve as flow promoters. In order to increase the stability of the solution, the pH was adjusted to 6.77 by the addition of acetic acid. The solution was then coated onto a primed PMMA panel, cured and tested, as in Example 1. The results, as given in Table 1 show that the adhesion, abrasion resistance, and surface resistivity were all satisfactory.

EXAMPLE 11

3-Aminopropyl diethoxymethyl silane (15.00 g) was added to a stirred vessel containing 85.00 g of SHC 5020®. The composition was coated onto an unprimed PMMA panels, and dried and cured as in Example 1. When tested by the procedures of Example 1, the abrasion resistance and surface resistivity were satisfactory, as indicated in Table 1. The adhesion to the unprimed substrate was unsatisfactory.

EXAMPLE 12

3-Aminopropyl triethoxysilane (25.00 g) was added to a stirred vessel containing 75.00 g of Silvue 100®. The composition was coated onto an unprimed PMMA panel, and dried and cured as in Example 1. When tested by the procedures of Example 1, the surface resistivity was satisfactory, as indicated in Table 1. The adhesion to the unprimed substrate and the abrasion resistance were unsatisfactory.

TABLE 1

| Ex. | MSQ base | Primer (+/−) | % APTES | % APDMES | SR (Ω/sq) | AR | ADH |
|---|---|---|---|---|---|---|---|
| 1 | Silvue 100 ® | − | 0 | 0 | ++ | + | 100 |
| 2 | Silvue 200 ® | − | 0 | 0 | ++ | + | 100 |
| 3 | SHC 5020 ® | − | 0 | 0 | ++ | + | 100 |
| 4 | SHC 5020 ® | − | 7.50 | 7.50 | S | + | 0 |
| 5 | SHC 5020 ® | + | 7.50 | 7.50 | S | + | 100 |

TABLE 1-continued

| Ex. | MSQ base | Primer (+/-) | % APTES | % APDMES | SR (Ω/sq) | AR | ADH |
|---|---|---|---|---|---|---|---|
| 6 | Silvue 100 ® | – | 15.00 | 0 | S | + | 0 |
| 7 | Silvue 100 ® | + | 15.00 | 0 | S | + | 100 |
| 8 | Silvue 200 ® | – | 15.00 | 0 | NM | + | 0 |
| 9 | Silvue 200 ® | + | 15.00 | 0 | S | + | 100 |
| 10 | Silvue 100 ® | + | 11.00 | 4.00 | S | + | 100 |
| 11 | SHC 5020 ® | – | 0 | 15.00 | S | + | 0 |
| 12 | Silvue 100 ® | – | 25.00 | 0 | S | + | 0 |

MSQ = methylsilsequioxane
SR = Surface Resistivity
AR = Abrasion Resistance
ADH = Adhesion
++ = Value >2.2 × $10^{14}$ Ω/sq, static dissipation unsatisfactory
S = value <5 × $10^{13}$ Ω/sq, static dissipation satisfactory
+ = Satisfactory abrasion resistance
NM = not measured The invention having now been fully described, it should be understood that it may be embodied in other specific forms or variations without departing from its spirit or essential characteristics. Accordingly, the embodiments described above are to be considered in all respects as illustrative and not restrictive, the scope of the invention being indicated by the appended claims rather than the foregoing description, and all changes which come within the meaning and range of equivalency of the claims are intended to be embraced therein.

We claim:

1. A curable coating composition for preparing an abrasion-resistant anti-static coating, said composition comprising a dispersion of colloidal silica and a curable methylsilsesquioxane in a lower alkanol, and an aminofunctional silane component compatible with said curable methylsilsesquioxane, said aminofunctional silane component being present in an amount effective to impart static-dissipative properties to cured coatings prepared therefrom.

2. The composition of claim 1 comprising from about 50% by weight to about 90% by weight of said dispersion of colloidal silica and a curable methylsilsesquioxane, and from about 10% by weight to about 50% by weight of said aminofunctional silane component.

3. The composition of claim 1 comprising from about 78% by weight to about 90% by weight of said dispersion of colloidal silica and a curable methylsilsesquioxane, and from about 10% by weight to about 22% by weight of said aminofunctional silane component.

4. The composition of claim 1 comprising from about 80% by weight to about 90% by weight of said dispersion of colloidal silica and a curable methylsilsesquioxane, and from about 10% by weight to about 20% by weight of said aminofunctional silane component.

5. The composition of claim 1 comprising about 85% by weight of said dispersion of colloidal silica and a curable methylsilsesquioxane, and about 15% by weight of said aminofunctional silane component.

6. The composition of claim 1 wherein said aminofunctional silane component comprises at least one aminofunctional silane selected from the group consisting of amino-$C_2$–$C_8$-loweralkyl-tri-$C_1$–$C_8$ loweralkoxy silanes.

7. The composition of claim 1 wherein said aminofunctional silane component comprises at least one aminofunctional silane selected from the group consisting of 3-aminopropyltriethoxy silane and 3-aminopropyldiethoxymethylsilane.

8. A coating solution for applying an abrasion-resistant and antistatic coating to a substrate, said coating solution comprising from about 40 parts by weight to about 60 parts by weight of the coating composition of claim 1, and from about 60 parts by weight to about 40 parts by weight of a flow enhancing component comprising one or more $C_2$–$C_5$-alkyl alcohols.

9. The coating solution of claim 8 wherein said flow enhancing component comprises a mixture of 10 parts by weight of 2-propanol and 1 part by weight of n-butanol.

10. A method of providing an abrasion-resistant antistatic coating on a substrate comprising 1) coating a substrate with a layer of the coating composition of claim 1, and 2) curing said layer of said coating composition.

11. A method of providing an abrasion-resistant antistatic coating on a substrate comprising 1) priming said substrate with a priming layer compatible with said substrate and said coating composition of claim 1, 2) coating said primed substrate with a layer of said coating composition, 3) curing said layer of said coating composition.

12. The method of claim 11 wherein said substrate is poly(methyl methacrylate) and said primer is an acrylic emulsion in glycol ethers and water.

13. An abrasion resistant antistatic coating prepared by the method of claim 10.

* * * * *